Aug. 14, 1962  M. AKHTAR  3,049,412
GAS ANALYZER

Filed Nov. 23, 1959  2 Sheets-Sheet 1

Inventor
Mohd Akhtar
By his attorneys

Howson and Howson

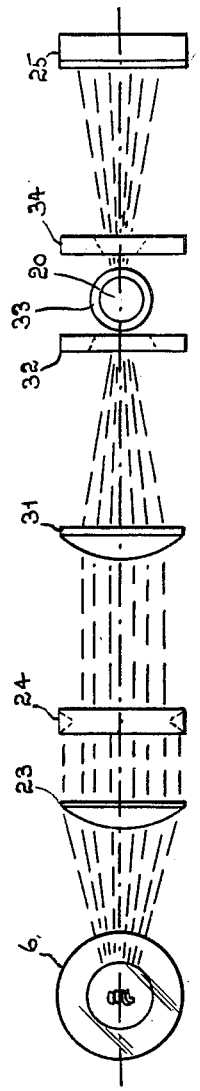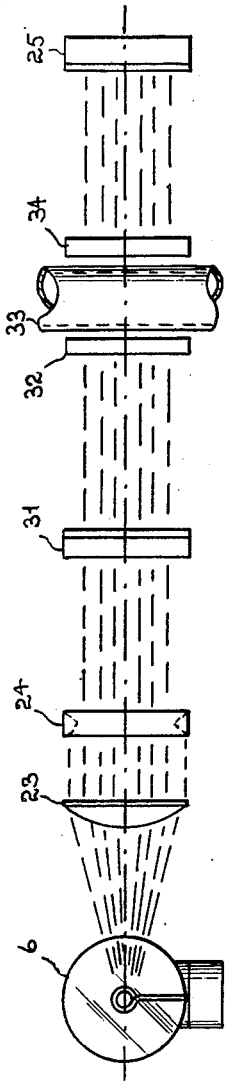

United States Patent Office 3,049,412
Patented Aug. 14, 1962

3,049,412
GAS ANALYZER
Mohd Akhtar, Balsall Common, near Coventry, England, assignor to Courtaulds Limited, London, England, a company of Great Britain
Filed Nov. 23, 1959, Ser. No. 854,900
Claims priority, application Great Britain Dec. 9, 1958
7 Claims. (Cl. 23—255)

This invention is concerned with the analysis of gaseous mixtures.

It is known that many gases can react with liquid reagents to produce solutions of coloured reaction products. By the term "liquid reagents" is meant liquids capable of reacting with gases to produce differently coloured reaction products in solution and includes solutions in an inert liquid of solid or liquid compounds whose colour is changed by a gas. It is also known to measure the intensity of the colour of a solution photo-electrically.

The object of the present invention is to provide an automatic analyser of gaseous mixtures with respect to certain component gases.

According to this invention an automatic analyser for continuously determining the proportion in a gaseous mixture of a gas capable of reacting with a liquid reagent to change the colour of that reagent, comprises a liquid reagent meter and a gas meter which both communicate with a reaction chamber which in turn communicates with a transparent analytical cell between a light source and an opposing photoelectric cell, the photoelectric cell being connected to a signal meter circuit arranged to register the strength of the signals generated in the photoelectric cell by light from the light source transmitted by the analytical cell.

The automatic measuring device to deliver the liquid reagent is preferably a gear pump, whereas the preferred gas meter comprises one or more lutes and constrictions such as capillary tubing in the gas delivery train. By "lute" is meant the liquid seal on a side tube of the gas train which releases gas from the train when the pressure of the gas in the train is greater than the head of liquid over the open end of the tube.

A preferred feature of the invention is that the volume of gas-treated liquid illuminated by the photoelectric device is automatically expelled from the analytical cell either continuously or at regular intervals so that the analysis is not vitiated by stagnant liquor diluting the incoming gas-treated liquid. A magnetically operated valve incorporating a solenoid may be used for expelling the gas treated liquid from the illuminated zone at regular intervals, whilst the continuous expulsion of the liquid may take place when the liquid runs continuously through a glass tube passing through the illuminated zone. The tube is preferably cylindrical with an internal diameter the optimum size of which will depend on the rate of flow of the liquid, but which for most purposes will be between 3/16 of an inch and 5/16 of an inch. Such a diameter is sufficiently small to minimise the conditions which cause the diffusion into the illuminated zone of previously analysed liquid. Focussing the illuminating rays on the axis of the cylindrical tube allows the rays to pass through the glass walls at right angles, thus eliminating refraction by the walls and ensuring that all the transmitted rays have the same path length through the liquid so that the transmitted light is homogeneous.

Examples of gas/liquid reagent combinations which may be used according to this invention are:

| Gas | Liquid reagent |
| --- | --- |
| Carbon disulphide | Copper salt/diethylamine/alcohol/triethanolamine. |
| Chlorine | O-toluidine/hydrochloric acid/water. |
| Ammonia | Nessler's reagent. |

In the estimation of one component of a gaseous mixture it may be necessary to remove from the mixture another component which interferes with the analytical colour-forming reaction before that reaction takes place. In such a case it is preferred to include apparatus in the gas train to remove the interfering gas from the mixture, for example Dreschel bottles containing cadmium acetate solution can be used to remove hydrogen sulphite from a gaseous mixture.

The invention is illustrated in the accompanying schematic drawings.

FIGURES 2 and 3 show an elevation and plan view of a modified analytical cell and optical system for continuous expulsion of liquid.

Figure 1:
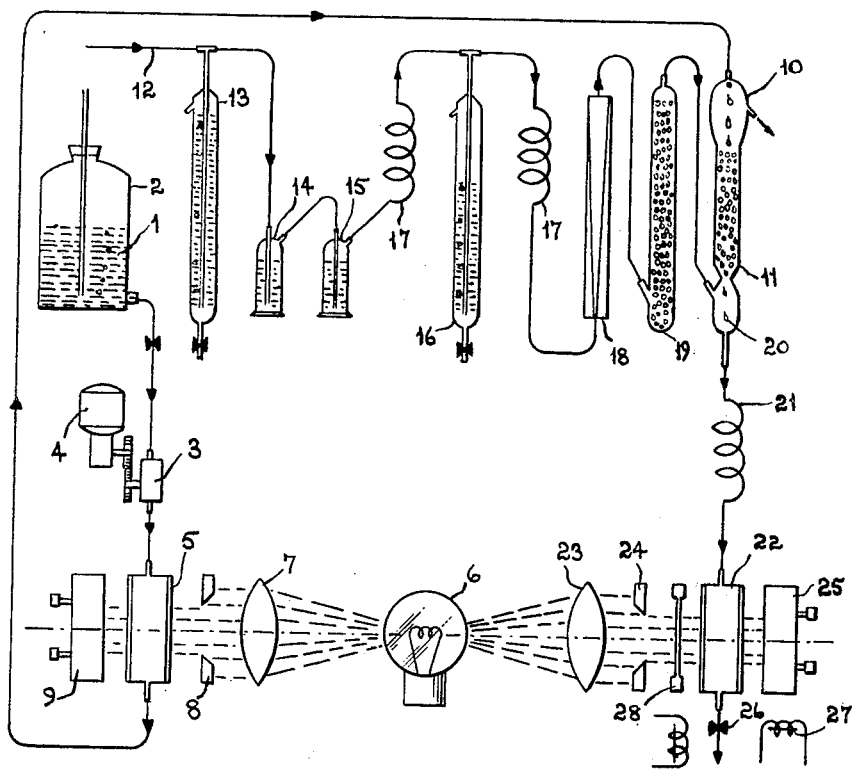
FIGURE 1 shows the lay-out of apparatus for the estimation of carbon disulphide in air polluted with hydrogen sulphide with intermittent expulsion of the liquid.

Referring to FIGURE 1, a liquid reagent 1 composed of ten mls. of diethylamine, twenty mls. of triethanolamine, 0.1 gram of cupric acetate and nine hundred and seventy mls. of industrial spirit is drawn at the rate of two hundred and thirty mls. per hour from a reservoir 2 by a gear pump 3 driven at twelve r.p.m. by a synchronous motor 4. The liquid output of the pump is fed into a reference cell 5 which is illuminated by a beam of light issuing from a lamp 6 and focussed and restricted respectively by a lens 7 and an iris 8. A photo cell 9 detects the light transmitted by the liquid in the cell 5 and a signal is generated in the reference circuit (not shown). From the cell 5 the liquid reagent is fed to the top of an analytical scrubber 10 packed with stainless steel gauge rings 11 through which the liquid percolates.

The air containing carbon disulphide and hydrogen sulphide is led through a gas train comprising a pipe 12, in which a lute 13 containing light oil controls the gas pressure, Dreschel bottles 14 and 15 containing cadmium acetate to free the air of hydrogen sulphide by the precipitation of cadmium sulphide, a second oil-containing lute 16 between two capillary coils 17, a rotameter 18 to indicate the rate of delivery of the air and a hydrogen sulphide scrubber 19 containing lead acetate impregnated pumice grains to ensure the complete removal of hydrogen sulphide. The gas train is connected to the base of the analytical scrubber 10 where the air rises in countercurrent to the percolating liquid reagent 1, so that the carbon disulphide reacts with the liquid reagent to produce the intensely coloured copper diethyl diethiocarbamate which remains in solution in the liquid. Gas-treated liquid 20 issuing from the analytical scrubber 10 is led through a delay coil 21, in which the liquid 20 is stored for about two minutes to allow the colour-forming reaction to come to equilibrium, before entering an analytical cell 22. The cell 22 is illuminated by the lamp 6, the light from which passes through a lens 23 and an iris 24 before reaching the cell. The transmitted light from the cell, which is a function of the intensity of colour in the liquid 20, is detected by a photocell 25 and a signal proportional to the incident light on the photocell 25 is generated in the meter circuit (not shown) to be recorded or read directly on a meter (not shown).

Once in three minutes the cell 22 is emptied of gas-treated liquid through a drain valve 26 which is automatically operated by a solenoid 27, the valve closing again after a sufficient time has elapsed to empty the cell, whereupon the gas-treated liquid 20 from the delay coil 21 replenishes the cell.

The apparatus is calibrated by analysing gaseous mixtures of known compositions, the results being incorporated in a curve relating meter reading to carbon disulphide content.

An important feature of the instrument is that the calibration of the instrument can be periodically checked by the use of one or more optical filters 28 which can be interposed in the beam of light directed to the analytical cell 22, the filters having been selected to give the right amount of absorption in the same spectral region as copper diethyl dithiocarbamate.

Referring to FIGURES 2 and 3, light from a source 6 is rendered into a parallel beam by a convex lens 23 and passes through an iris 24 before being focussed by a cylindrical lens 31 through a slit 32 on to the axis of an analytical tube 33 through which the gas-treated liquid 20 flows when the apparatus is in use. The divergent transmitted light leaving the cell passes through a slit 34 before falling on a photocell 25.

What I claim is:

1. In an automatic analyser for continuously determining the proportion in a gaseous mixture of a gas capable of reacting with a liquid reagent to change the color of that reagent wherein the analyser includes a reference cell through which the reagent flows, a reaction chamber having connections for admission of the reagent and the gaseous mixture and for outlet of the gas-treated reagent, and a cylindrical analytical cell through which the gas-treated reagent passes, the combination comprising a light source, a photoelectric cell, said cylindrical cell being between the light source and the photoelectric cell, and a lens system between the light source and the cylindrical cell including means to render the light from the light source into a parallel beam, and means to condense said parallel beam perpendicularly onto and along the axis of the cylindrical cell.

2. An automatic analyser as claim in claim 1 in which the means to render the light into a parallel beam comprises a convex lens adjacent the light source, and the means to condense the parallel beam comprises a cylindrical lens adjacent the cylindrical cell.

3. An automatic analyser as claimed in claim 2, having a screen adjacent said cylindrical cell having a slit parallel to the axis of said cylindrical cell through which slit the condensed light focuses on said cell axis.

4. An automatic analyser as claimed in claim 3 having a second screen between said cylindrical cell and said photoelectric cell with a slit parallel to the axis of said cylindrical cell through which light passing from said cylindrical cell focuses on said photoelectric cell.

5. An automatic analyser as claimed in claim 1 in which the means to condense the light from the light source perpendicularly onto the axis of the cylindrical cell comprises a cylindrical lens.

6. An automatic analyser as claimed in claim 5, having a screen adjacent said cylindrical cell having a slit parallel to the axis of said cylindrical cell through which slit the condensed light focuses on said cell axis.

7. An automatic analyser as claimed in claim 6 having a second screen between said cylindrical cell and said photoelectric cell with a slit parallel to the axis of said cylindrical cell through which light passing from said cylindrical cell focuses on said photoelectric cell.

References Cited in the file of this patent

UNITED STATES PATENTS

| | | |
|---|---|---|
| 2,382,381 | Calvert et al. | Aug. 14, 1945 |
| 2,413,261 | Stackhouse | Dec. 24, 1946 |
| 2,880,073 | Lupfer et al. | Mar. 31, 1959 |

FOREIGN PATENTS

| | | |
|---|---|---|
| 454,834 | Great Britain | Oct. 8, 1936 |